(12) United States Patent
Queru (10) Patent No.: US 8,863,040 B2
(45) Date of Patent: Oct. 14, 2014

(54) GESTURE-BASED SELECTION

(75) Inventor: Jean Baptiste Maurice Queru, Foster City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/154,940

(22) Filed: Jun. 7, 2011

(65) Prior Publication Data

US 2012/0174041 A1    Jul. 5, 2012

Related U.S. Application Data

(60) Provisional application No. 61/429,510, filed on Jan. 4, 2011.

(51) Int. Cl.
*G06F 3/033* (2013.01)
*G06F 3/0488* (2013.01)
*B60K 35/00* (2006.01)
*B60K 37/06* (2006.01)
*G06F 3/023* (2006.01)
*G06F 3/01* (2006.01)

(52) U.S. Cl.
CPC ............. *G06F 3/017* (2013.01); *G06F 3/0488* (2013.01); *G06F 3/04883* (2013.01); *B60K 2350/1004* (2013.01); *B60K 2350/1052* (2013.01); *B60K 35/00* (2013.01); *B60K 37/06* (2013.01); *G06F 3/0236* (2013.01)
USPC ........................................................ 715/863

(58) Field of Classification Search
CPC .................................................. G06F 3/0488
USPC .................... 715/765, 863; 345/173
See application file for complete search history.

(56) References Cited

U.S. PATENT DOCUMENTS

| 4,764,972 | A  | * | 8/1988  | Yoshida et al. ............... 382/187 |
| 5,544,259 | A  | * | 8/1996  | McCubbrey ................... 382/177 |
| 7,382,358 | B2 | * | 6/2008  | Kushler et al. ................ 345/168 |
| 7,454,717 | B2 |   | 11/2008 | Hinckley et al. |
| 7,565,294 | B2 |   | 7/2009  | Rhoads |
| 7,706,616 | B2 | * | 4/2010  | Kristensson et al. .......... 382/187 |
| 7,793,228 | B2 | * | 9/2010  | Mansfield et al. ............. 715/780 |
| 8,223,134 | B1 | * | 7/2012  | Forstall et al. ................. 345/173 |
| 8,650,510 | B2 | * | 2/2014  | Goertz .......................... 715/863 |
| 2004/0070571 | A1 |   | 4/2004  | Woodard et al. |
| 2006/0026521 | A1 | * | 2/2006  | Hotelling et al. ............. 715/702 |
| 2006/0029452 | A1 | * | 2/2006  | Matias .......................... 400/486 |

(Continued)

OTHER PUBLICATIONS

United States Office Action in U.S. Appl. No. 13/249,318, dated Jan. 5, 2012, 10 pages.

(Continued)

*Primary Examiner* — William Bashore
*Assistant Examiner* — Nathan Shewsbury
(74) *Attorney, Agent, or Firm* — Fish & Richardson P.C.

(57) ABSTRACT

Methods, systems, and apparatus, including computer programs encoded on a computer storage medium, for gesture-based selection. In one aspect, a method includes displaying, on a user interface, information referencing a first set of data items, and at least one control that references multiple values, identifying a first gesture input by a user using the control, selecting a first value based on the first gesture, identifying a second gesture input by the user using the control, selecting a second value based on the second gesture, selecting a second set of data items to display based on the first and second values, and displaying information referencing the second set of data items.

15 Claims, 5 Drawing Sheets

(56) References Cited

U.S. PATENT DOCUMENTS

| | | | |
|---|---|---|---|
| 2007/0040813 A1* | 2/2007 | Kushler et al. | 345/173 |
| 2007/0063992 A1* | 3/2007 | Lundquist | 345/174 |
| 2008/0086704 A1* | 4/2008 | Aravamudan | 715/854 |
| 2008/0165136 A1 | 7/2008 | Christie et al. | |
| 2008/0177468 A1 | 7/2008 | Halters et al. | |
| 2008/0204282 A1* | 8/2008 | Jeon | 341/22 |
| 2008/0204426 A1 | 8/2008 | Hotelling et al. | |
| 2008/0229222 A1 | 9/2008 | Kake | |
| 2008/0316183 A1* | 12/2008 | Westerman et al. | 345/173 |
| 2009/0066659 A1* | 3/2009 | He et al. | 345/173 |
| 2009/0077501 A1 | 3/2009 | Partridge et al. | |
| 2009/0228825 A1 | 9/2009 | Van et al. | |
| 2010/0050076 A1 | 2/2010 | Roth | |
| 2010/0050133 A1 | 2/2010 | Nishihara et al. | |
| 2010/0060586 A1 | 3/2010 | Pisula et al. | |
| 2010/0153881 A1 | 6/2010 | Dinn | |
| 2010/0199226 A1* | 8/2010 | Nurmi | 715/863 |
| 2010/0218663 A1 | 9/2010 | Choi | |
| 2010/0231546 A1* | 9/2010 | Digon | 345/173 |
| 2010/0251176 A1* | 9/2010 | Fong et al. | 715/821 |
| 2010/0251180 A1 | 9/2010 | Cragun et al. | |
| 2010/0277420 A1 | 11/2010 | Charlier et al. | |
| 2011/0004330 A1 | 1/2011 | Rothkopf et al. | |
| 2011/0050594 A1 | 3/2011 | Kim et al. | |
| 2011/0074710 A1 | 3/2011 | Weeldreyer et al. | |
| 2011/0154267 A1* | 6/2011 | Nurmi | 715/863 |
| 2011/0167058 A1 | 7/2011 | van Os | |
| 2011/0173539 A1 | 7/2011 | Rottler et al. | |
| 2011/0185306 A1* | 7/2011 | Aravamudan | 715/773 |
| 2011/0196864 A1 | 8/2011 | Mason et al. | |
| 2011/0205156 A1 | 8/2011 | Gomez et al. | |
| 2011/0221685 A1 | 9/2011 | Lee et al. | |
| 2011/0252346 A1 | 10/2011 | Chaudhri | |
| 2011/0258542 A1* | 10/2011 | Kenney et al. | 715/702 |
| 2011/0283188 A1* | 11/2011 | Farrenkopf et al. | 715/702 |
| 2011/0302518 A1* | 12/2011 | Zhang | 715/773 |
| 2012/0030606 A1* | 2/2012 | Zhang | 715/773 |
| 2012/0117506 A1* | 5/2012 | Koch et al. | 715/773 |
| 2012/0159404 A1* | 6/2012 | Vasireddy et al. | 715/863 |
| 2013/0002562 A1* | 1/2013 | Leskela et al. | 345/169 |

OTHER PUBLICATIONS

"iPod Classic (120GB)—User Guide," downloaded from http://manuals.info.apple.com/en_US/iPod_classic_120GB_en.pdf (Sep. 9, 2008).

"iPod Touch Features Guide," downloaded from http://manuals.info.apple.com/en_US/iPod_touch_Features_Guide.pdf (Mar. 10, 2008).

Notification of Transmittal of the International Search Report and the Written Opinion of the International Searching Authority, or the Declaration issued in PCT US2012/020181 on Jun. 18, 2012, 11 pages.

United States Final Office Action in U.S. Appl. No. 13/249,318, dated Apr. 24, 2012, 18 pages.

United States Final Office Action in U.S. Appl. No. 13/249,318, dated Dec. 4, 2012, 22 pages.

United States Final Office Action in U.S. Appl. No. 13/249,318, dated May 22, 2013, 5 pages.

Notification Concerning Transmittal of International Preliminary Report on Patentability issued in PCT/US2012/020181 on Jul. 18, 2013, 8 pages.

* cited by examiner

GESTURE-BASED SELECTION

CROSS REFERENCE TO RELATED APPLICATION

This application claims priority to U.S. Provisional Application No. 61/429,510, filed on Jan. 4, 2011. The entire contents of U.S. Provisional Application No. 61/429,510 are incorporated herein by reference.

BACKGROUND

Users of computers, phones, televisions, and other devices often have access to vast amounts of information. Users often attempt to search for particular items within a large group of items. Users often spend significant amounts of time searching for this information.

SUMMARY

According to one general implementation, a user may search for items in a long list of items by selecting a first value, e.g., a first character, of a name of the item with a first gesture, and selecting a subsequent value, e.g., a second character, of the name of the item with a second gesture. The user may progress through the name of the item by selecting one value at a time with individual gestures that spawn additional controls (e.g., scroll bars) when a particular portion is selected, by using two separate, concurrently displayed controls, or by using a single control through the iterative selection and "locking in" of values with a "lock in" gesture. Items that match the user-selected values are searched and displayed in real time to receiving the gestures.

In general, another aspect of the subject matter described in this specification may be embodied in methods that include the actions of: displaying, on a user interface, information referencing a first set of data items, and at least one control that references multiple values; identifying a first gesture input by a user using the control; selecting a first value based on the first gesture; identifying a second gesture input by the user using the control; selecting a second value based on the second gesture; selecting a second set of data items to display based on the first and second values; and displaying information referencing the second set of data items.

Other embodiments of this aspect include corresponding systems, apparatus, and computer programs, configured to perform the actions of the methods, encoded on computer storage devices.

These and other embodiments may each optionally include one or more of the following features. For example, after selecting the first value, identifying a first confirmatory gesture input by the user using the control, where the second gesture is identified after identifying the first confirmatory gesture input by the user using the control. The at least one control is a single control, and first gesture and the second gesture are input using the single control. Displaying at least one control that references multiple values includes displaying a first control, identifying the first gesture input by a user using the control includes identifying the first gesture input by a user using the first control, after selecting the first value, displaying a second control that references multiple values, identifying the second gesture input by the user using the control includes identifying the second gesture input by the user using the second control, and the first value is selected before the second value is selected.

These and other embodiments may also each optionally include one or more of the following features. For example, displaying at least one control that references multiple values includes displaying a first control that references multiple values and displaying a second control that references multiple values, identifying the first gesture input by a user using the control includes identifying the first gesture input by a user using the first control, and identifying the second gesture input by the user using the control includes identifying the second gesture input by the user using the second control. The first control is located at a left side of the user interface and the second control is located at a right side of the user interface. The second value can be selected using the second control before the first value is selected using the first control. The information referencing a first set of data items is sorted, and the first value and the second value are included in a query. The first value is a character and the second value is a character. The first value is a unit of time and the second value is a different unit of time. Selecting the first value includes selecting a value displayed on the control when the first gesture ends, and selecting the second value includes selecting a value displayed on the control when the second gesture ends. A gesture ends when the gesture exceeds a defined area or after no movement greater than threshold level is detected for predetermined period of time.

Advantageous implementations can include one or more of the following features. A user can input multiple values using gestures. Selection and searches can be quickly performed based on multiple values, rather than a single value. Information, especially items in long lists, can be identified quickly. The amount information that a user is required to read to find an item in a list can be reduced.

The details of one or more implementations are set forth in the accompanying drawings and the description below. Other features and advantages will become apparent from the description, the drawings, and the claims.

DETAILED DESCRIPTION

Figure 1:
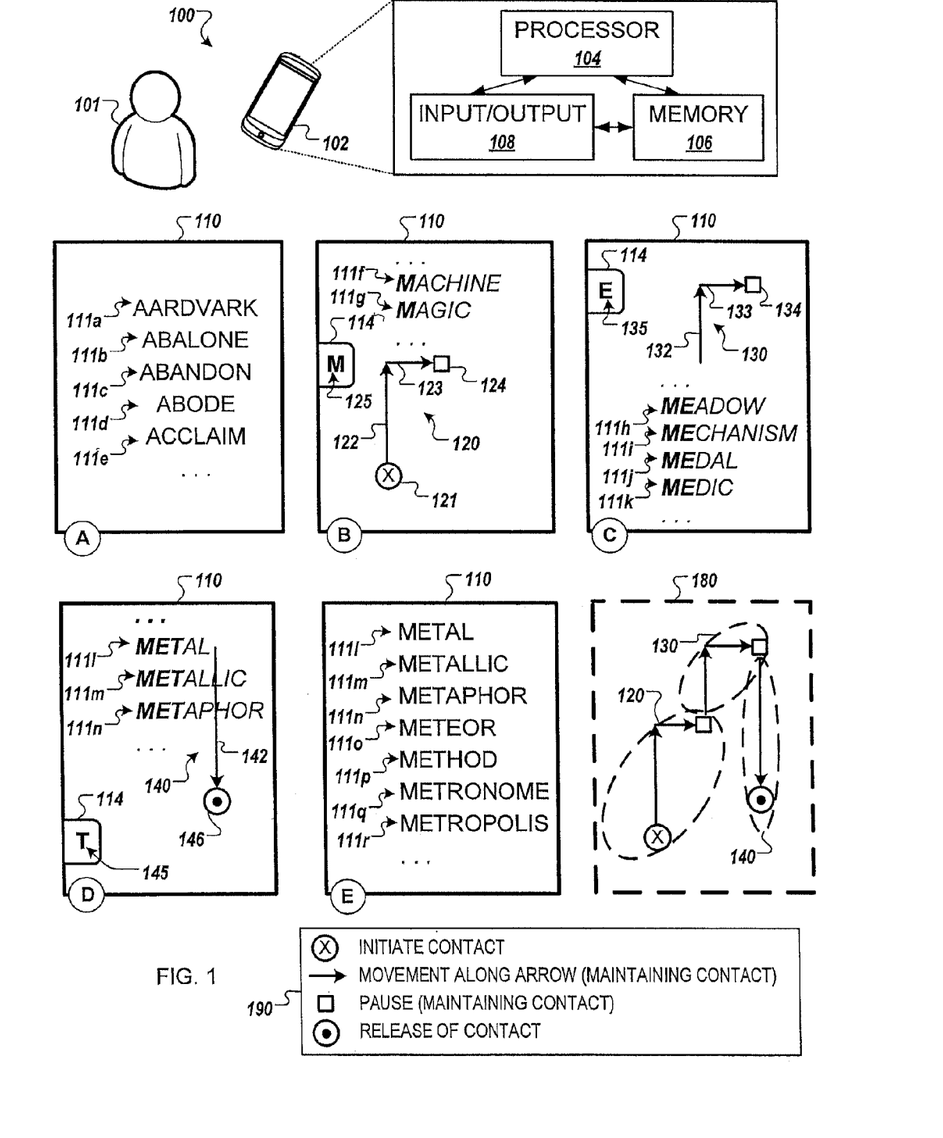
FIG. 1 is a diagram of an example system that can perform gesture-based selection.

FIG. 1 is a diagram of an example system that can perform gesture-based selection. System 100 includes a computing device ("device") 102 that includes a processor 104, a memory device 106, and one or more components 108 that provide input/output functionality. The diagram shows states (A) to (E) illustrating a user interface 110 and input from a user 101. A summary diagram 180 of the gestures is illustrated, as well as a key 190 that describes symbols used in FIG. 1.

A control enables a user to locate and select information using gestures. Using multiple gestures, a user can input multiple values and select information based on the values. For example, the user can perform a search based on the values. As an example, the user can use the control to search for a particular title in a list of titles. The user can input a first gesture on a user interface to select, for example, the first letter of a title. The user can input a second gesture on the user interface to select, for example, a second letter of the title. The user interface is updated to display titles matching both the first letter and second letter. By searching using multiple values, such as letters, the user can locate a searched-for title more quickly than when searching based on a single value. Using additional gestures, the user can select additional values and refine the search. This permits the user to quickly locate information and, for example, select a subset of data items from among a larger set of data items.

The system 100 includes the device 102. Examples of devices 102 include computer systems, laptops, telephones, portable music players, personal digital assistants, electronic games, remote controls, televisions, and household appliances. The device 102 includes at least one processor 104 coupled to at least one memory device 106. Among other data, the memory device 106 can store information that the user 101 can access, for example, music, images, video, documents, and other data. The device 102 can include a network adapter (not shown) to permit the device 102 to send and receive data over a network (not shown). The system 100 can optionally include one or more other devices in communication with the device 102.

The device 102 includes one or more input/output components 108, which enables the user 101 to enter input on the device 102 and receive output from the device 102. Various implementations can provide output in, for example, visual, audible, and/or tactile forms. For example, the device 102 can include a screen to visually display information to the user 101. The input/output components 108 also permit the device 102 to detect gestures of the user 101. For example, the device 102 can include a touch-sensitive screen, touchpad, or other touch-sensitive surface that can detect contact, such as contact with the finger of a user or contact with a stylus. The device 102 can include a movement tracking device or a pointing device (such as a mouse or trackball) that allows the device 102 to detect a gesture of the user 101. Additionally, or as an alternative, the device 102 can include a camera to detect gestures of the user 101.

During state (A), the user 101 navigates to a user interface 110 displaying information that references data items 111a-111e. The information can be displayed in a list format, and can represent, for example, song titles, artist names, movie titles, document names, contacts list entries, and other types of information referencing the data items 111a-111e. The data items 111a-111e can be a subset of a larger collection of data items 111a-111r. Due to screen area constraints or other factors, information about all of the data items 111a-111r may not be simultaneously be displayed on the user interface 110.

The information displayed for each data item 111a-111e can be associated with, for example, an action or additional data. For example, the data items 111a-111e can be music files, and the information displayed can indicate the titles of the music files. By selecting information corresponding to a particular data item 111a, the user 101 can cause the device 102 to initiate playback of a music file that has the title indicated by the data item 111a.

The data items 111a-111r can be sorted. For example, the data items 111a-111r can be listed alphabetically, chronologically, etc. Information that references the data items 111a-111r can be displayed on the user interface 110 in the sorted order.

During state (B), the user 101 performs a first gesture 120 using a control 114, which causes a first value 125 to be selected. The control 114 is displayed on the user interface 110 and references a set of values, for example, the set of letters in the alphabet. The control 114 receives one or more gestures as input and, based on the gestures, selects values from among the referenced set of values. The device 102 detects the movements and contacts that are part of the first gesture 120, identifies the first gesture 120, and selects the first value 125 based on the first gesture 120. In the illustrated example, the first gesture 120 includes several components that together cause the first value 120 of "M" to be selected. In response, the user interface 110 is updated to display information referencing data items 111f and 111g that match the selected first value 120.

As an example, the control 114 allows the user 101 to select a letter of the alphabet as the first value 120. To select a letter, the user 101 performs a first gesture 120 by touching a touch-sensitive screen with a finger and moving the finger while in contact with the screen. By moving the finger upward, for example, the control 114 can select a preceding letter in the alphabet (e.g., "G", then "F", then "E"). By moving the finger downward, the control 114 can select a subsequent letter in the alphabet (e.g., "G", then "H", then "I"). The control 114 can indicate the first value 125 that is currently selected.

As the first gesture 120 is detected, and as the first value 125 changes in response, the user interface 110 is updated to display information referencing data items 111a-111r that match first value 125 that is currently indicated on the control 114. For example, when the user 101 performs the first gesture 120 to select the letter "M" as the first value 125, the user interface 110 is updated to display data items 111f and 111g that begin with the letter "M" (e.g., "machine" and "magic"). The data items 111a-111r that are displayed on the user interface 110 can change in real time to match the first value 125 selected using the control 114.

The control 114 can be displayed on the user interface 110 in response to a particular input, for example, a contact with a particular portion of a touch-sensitive screen. As an example, the user 101 may touch a particular corner of the screen to cause the control 114 to be displayed. The control 114 can also be displayed automatically when a particular user interface 110 is displayed on the device 102. For example, the control 114 can be displayed whenever the user 101 navigates to a user interface 110 that includes a list of data items 111a-111r. In some implementations, the control 114 can be displayed in a visible but inactive state until a condition occurs to activate the control 114, for example, the user 101 selects the control 114 or contacts the touch-sensitive surface. The control 114 can also be hidden while a gesture is not performed, such as during state (A).

The first gesture 120 that is performed using the control 114 can includes multiple components. Components of a gesture can include, for example, an initiation of contact, release of contact, motions in different directions, and delays. For example, the first gesture 120 can include: (i) an initial contact with a touch-sensitive surface (an "initial contact") 121, which may occur subsequent to other contacts and gestures; (ii) movement along a generally linear path, in one or more directions along the path (a "vertical movement") 122; (iii) a movement in a direction generally perpendicular to the vertical movement (a "horizontal movement") 123; and (iv) a period of limited movement (a "pause"). The first gesture 120 can be continuous, meaning that after the initial contact 121, contact with the touch-sensitive screen is maintained during the vertical movement 122, horizontal movement 123, and the pause 124. The first gesture 120 is considered to be continuous even with momentary termination of contact if, for example, contact is restored within a threshold time period. Similarly, the pause 124 can include a period of time during which motion on the contact surface is below a threshold level.

The horizontal and vertical movements can be aligned with the boundaries of a screen or surface, but are not required to be so aligned. Similarly, no particular orientation of a screen is necessary. In some implementations, regardless of the alignment of screen or touch-sensitive surface, the horizontal and vertical movements can be generally perpendicular to each other, within a particular tolerance (e.g., the angle defined between the horizontal and vertical movements is between approximately 45 and 135 degrees).

The term "first gesture" 120 describes the first gesture that the user 101 performs to select a first value 125 using the control 114. The first gesture 120 is not necessarily an initial gesture of the user 101 when using the device 102 or when interacting with the user interface 110. The user 101 may perform multiple gestures before performing the first gesture 120 during state (B). In addition, the first gesture 120 is not required to include the initial contact 121. In some instances, the user 101 may have previously initiated contact with the touch-sensitive surface, so that an initial contact 121 is unnecessary. To identify the first gesture 120 and distinguish it from other gestures, the device 102 can identify movements that are generally linear, movements in a particular location, or movements in a particular direction. The device 102 can determine that various movements correspond to the vertical movement 122, and begin selecting the first value 125 based on the continuation of a previous contact with the touch-sensitive screen.

The various components of the first gesture 120 can have, but are not required to have, related functions. As described above, the initial contact 121 can cause the control 114 to be displayed or to become activated. The vertical movement 122 can be a selection component that enables the user 101 to select among multiple values associated with the control 114, for example, to scroll through a set of values referenced by the control 114. The horizontal movement 123 and the pause 124 can be confirmatory components that confirm the selection of the first value 125 and indicate that a second value should be selected.

During the vertical movement 122, the first value 125 indicated on the control 114 changes. The information displayed on the user interface 110 also changes to reference data items 111*f* and 111*g* that match the first value 125. For example, during the vertical movement 122, as the user 101 changes the current first value 125 of the control 114 of "H", the user interface 110 can display data items 111*a*-111*r* that begin with the letter "H"; when the first value 125 is "I", data items that begin with "I" are displayed, and so on.

The vertical movement 122 can include multiple motions up and down. For example the user 101 can select a letter near the beginning of the alphabet (such as "A"), then near the end of the alphabet (such as "Z"), and then near the beginning of the alphabet again (such as "B"), within the same vertical movement 122. In some implementations, vertical movements continue to change the first value 125 as long as contact with the touch-sensitive surface is maintained during the motions.

The horizontal movement 123 and pause 124 confirm that the current first value 125 indicated on the control 114 should be selected. The pause 124 can be greater than a predetermined time period set by the device 102, such as a pause 124 lasting at least half a second, or a pause lasting at least one second. In some implementations, the horizontal movement 123 alone can confirm the selection of the current first value 125, without the pause 124. By contrast, in some implementations, the pause 124 alone can confirm the selection of the first value 125, without the horizontal movement 123.

In some implementations, the horizontal movement 123 and pause 124 cause the first value 125 to be set or "locked in" so that subsequent vertical motions will not change the first value 125. Rather than change the first value 125, further vertical movement can select a second value.

As the horizontal movement 123 and pause 124 are performed, the device 102 can detect the completion of the first gesture 120 and lock in the selected first value 125. As described above, the first gesture 120 can be performed while contact is maintained with a touch-sensitive surface, from the initial contact 121 through the end of the pause 124. The device 102 can perform an initial search based on the first value 125 and display data items 111*f* and 111*g* that match the first value 125 if such data items 111*f* and 111*g* are not currently displayed. The device 102 can also adjust the control 114 to subsequently set a second value to be used to refine the search.

During state (C), the user 101 performs a second gesture 130, using a control to select a second value 135. The user 101 can select the second value 135 using the same control 114 that was used to select the first value 125. The device 102 detects the motions and contacts that are included in the second gesture, identifies the second gesture 130, and selects the second value 135 based on the second gesture 130. In the illustrated example, the second gesture 130 includes several components that cause the second value 130 of "E" to be selected. The device 102 causes information that references data items 111*h*-111*k* to be displayed, because the data items 111*h*-111*k* match both the first value 125 "M" and the second value 135 "E".

Even though searching in a list by a first value 125 (such as a first letter) narrows the data items 111*a*-111*r*, in very large lists, however, even the portion matching the first value 125 may include an excessive number of titles. Searching using a second value 135 or additional values can allow the user 101 to identify searched-for content much more quickly than scrolling through a list that is narrowed by only a single value.

The second gesture 130 can begin at the location on a touch-sensitive screen where the first gesture 120 terminates. The second gesture 130 can also continue contact with the touch-sensitive surface so that, during both the first gesture 120 and the second gesture 130, contact is maintained with at least some portion of the touch-sensitive surface. In other words, the first gesture and the second gesture can trace a generally continuous path on the touch-sensitive surface, with the second gesture 130 beginning in the general location that the first gesture 120 ends.

The second gesture 130, similar to the first gesture 120, can include a selection component to select the second value 135 and a confirmatory component to confirm the selection. For example, the second gesture 130 can include a generally vertical movement 132, a generally horizontal movement 133, and a pause 134, similar to those described above for the first gesture 120.

During the vertical movement 132, the second value 135 associated with the control 114 changes. As the second value 135 changes, the device 102 updates the user interface 110 to display data items 111*h*-111*k* that match both the first value 125 and the second value 135. In the illustrated example, the first value 125 ("M") corresponds to the first letter of a word and the second value 135 corresponds to the second letter of a word. The device 102 displays data items 111*h*-111*k* that are displayed include "meadow", "mechanism", "medal", and "medic", which match the combination of the first value 125 ("M") and the second value 135 ("E"). At the conclusion of the pause 134 of the second gesture 130, the second value 135 is locked in so that subsequent vertical movements select a third value.

During state (D), the user 101 performs a third gesture 140 using a control to select a third value 145. The user 101 can use the control 114 to enter the third gesture 140. The device 102 detects the motions and contacts included in the third gesture 140, identifies the third gesture 140, and selects the third value 145 based on the third gesture 140. In the illustrated example, the third value 145 indicates the third letter in a sequence of letters that make up a search term. The third value 145 is selected to be "T". With the first value 120 ("M") and the second value 130 ("E"), the searched-for sequence is "MET". The device 102 displays data items 111*l*-111*n* that match the sequence, e.g., "metal", "metallic", and "metaphor".

The third gesture 140 can continue the same generally continuous contact first initiated during the first gesture 120. The third gesture 140 can also begin with a contact at generally the same location where the second gesture 130 ends. The third gesture 140 can include a generally vertical movement 142 and a release 146 of contact from a touch-sensitive surface. The vertical movement 142 can select the third value 145 indicated by the control 114 similar to the selections associated with the vertical movements 122, 132 described above.

The release 146 of contact can lock in the current third value 145 indicated by the control 114, thus confirming the selection. In some implementations, no additional confirmatory gesture component is needed to set the value of the third value 145. In other implementations, the third gesture 140 can include an additional confirmatory gesture component (such as a pause, a horizontal movement, a horizontal movement and a pause, etc.). The release 146 can include an interruption of contact with a touch sensitive surface for a period of time greater than a threshold. Additionally, or alternatively, the release 146 can be detected by the device 102 as a disruption of the path traced by the first gesture 120, the second gesture 130, and the third gesture 140. For example, the release 146 can be detected as a break in the path with a subsequent contact in a remote area of the screen (e.g., exceeding a threshold distance from the path traced by the gestures 120, 130, 140, or from the last point on the path.) The release 146 can indicate to the device 102 that no additional values are to be selected for the current search. In other words, releasing contact with the touch-sensitive surface can indicate that, for example, a fourth value will not be included in the search.

During state (E), the device 102 displays data items 111*l*-111*r* that match the first value 125 "M", the second value 135 "E", and the third value 145 "T" on the user interface 110. The control 114 can be deactivated or removed from the user interface 110. The user interface 110 can permit the user 101 to scroll or otherwise navigate within the results of the search, the data items 111*l*-111*r*. Similarly, the user 101 can select a particular data item 111*l*-111*r* to view or play content associated with the particular data item 111*l*-111*r*.

The user interface summary diagram 180 illustrates an overlay of the first gesture 120, the second gesture 130, and the third gesture 140. A key 190 illustrates symbols used in the illustrations, in accordance with the description above.

In general, the first gesture 120, the second gesture 130, and the third gesture 140 can include more or fewer components than those described. Similarly, more or fewer gestures can be used to select more or fewer values with which to search. The gestures 120, 130, 140 can be performed over a section of a screen that displays information referencing data items 111*a*-111*r*, but for clarity in illustration, a full listing of data items 111*a*-111*r* is omitted.

In some implementations, from the state (E), the user 101 may also re-activate the control 114 to select additional values to refine a search. For example, the user 101 may activate the control 114 causing it to be displayed on the user interface 110, and then select a fourth value with a fourth gesture.

The control 114 can also receive a gesture to unselect a value. The control 114 can receive a deletion gesture that removes a previously selected value from a search. The device 102 can, for example, identify a particular type of gesture that to transition from state (C) (in which the first value 125 is locked in and cannot be altered using the control 114) to state (B) (in which the first value is selectable). In addition, the device 102 can identify a cancellation gesture input using the control 114 that indicates that all selected values 125, 135, 145 should be removed and that the search should start over.

During state (B) through state (D), the italicized script for the data items 111*f*-111*n* indicate that the data items displayed vary according to the selections of the control 114, and thus the particular data items displayed varies. In addition, the italicized script can indicate that the display can occur in the background, with other elements being displayed in the foreground of the user interface 110. Also, as the user 101 alters the selection of the values associated with the control 114, the control can indicate when no data items 111*a*-111*r* a particular value. For example, the control 114 can display the value having not matching data items 111*a*-111*r* as being grayed-out or otherwise differentiated from values for which matching data items 111*a*-111*r* do occur in the collection.

In addition, the device 102 can detect contact and motion for the gestures 120, 130, 140 in a variety of ways. For example, the device 102 may store coordinates that correspond to various locations of a touch-sensitive surface that have been contacted, and the sequence of the contacts. A gesture can be input in various ways, for example, by movement of a person. Gestures can also be input with the aid of an input device, for example, a mouse, trackball, remote control, and so on.

Although the data items 111*a*-111*r* are illustrated as text, data items 111*a*-111*r* can include icons, images, videos, and other forms of information, including combinations of various types of data. The data items 111*a*-111*r* may be displayed with or without identifiers that match the values selected using the control 114. In addition, the selection of values using the control 114 is not limited to selecting letters or even to selecting text. The values selected by the control 114 can include non-alphanumeric symbols, colors, dates, times, places, and other information. The values can represent any search criteria that can be selectable.

Figure 2:
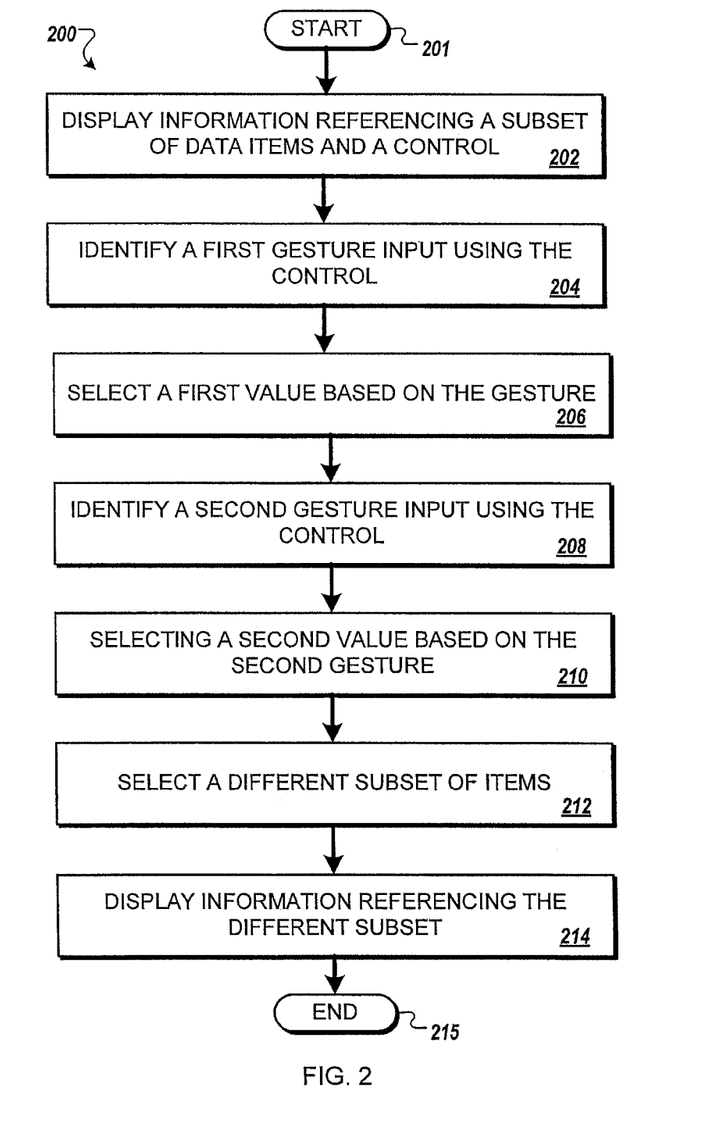
FIG. 2 is a flow diagram illustrating an example process for selection with gestures.

FIG. 2 is a flow diagram illustrating an example process 200 for selection with gestures. Briefly, the process 200 includes displaying, on a user interface, information referencing a subset of data items, and at least one control that references multiple values, identifying a first gesture input by a user using the control, selecting a first value based on the first gesture, identifying a second gesture input by the user using the control, selecting a second value based on the second gesture, selecting a different subset of the data items to display based on the first and second values, and displaying information referencing the different subset of data items.

In further detail, when the process 200 begins (201), (i) information referencing a subset of data items and (ii) at least one control that references multiple values is displayed on a user interface (202). The control can be a single control that can used to input multiple gestures. For example, the first gesture, second gesture, confirmatory gestures, and other gestures can be input using the single control. The control can reference multiple values and allow the selection of one or more of those values. The control can move on a user interface in response to a gesture. The control can indicate a value that is currently selected by the control.

The information referencing a subset of data items can be sorted. The information referencing a subset of data items can include a list that references the subset of data items. The information displayed can include an ordered list, for example, a ordered list of identifiers of data items.

In some implementations, the values referenced by the data items can correspond to values used to order the display of data items. For example, when the information referencing the data items is ordered alphabetically, the values can be characters (e.g., letters and/or numbers) or sequences of characters. Similarly, when the information referencing the data items is ordered chronologically, the values can correspond to units of time.

A first gesture, input by a user using the control, is identified (204). The first gesture can include multiple component movements. The first gesture can include a generally continuous contact with a touch-sensitive surface.

In some implementations, a gesture is identified as the first gesture because it includes a particular feature or combination of features. The first gesture can be identified by the detection of a generally vertical movement, for example. The first gesture can also be identified by the detection of particular movements in a sequence, for example, a generally vertical movement followed by a generally horizontal movement, or a pause of a particular duration.

A first value is selected based on the first gesture (206). The first value can be a first search criterion that is used to search for data items in a collection of data items. In some implementations, the user interface can be updated after selecting the first value and before selecting a second value. A search can be performed based on the first value, and information referencing a different subset of data items can be displayed. For example, information describing or indicating data items that match the first value can be displayed.

The display of the control on the user interface can be updated during the first gesture to indicate the value selected by the control at a given point in time. The user interface can be updated during the first gesture to display different subsets of data items that match the value indicated by the control at a particular point in time. The first value can be selected as the value indicated by the control when the first gesture ends.

A second gesture, input by the user using the control, is identified (208). Like the first gesture, the second gesture can include multiple components (e.g., movements, pauses, etc.), and can include a generally continuous contact with a touch-sensitive surface. The second value can also be a search criterion used to search for data items. The second value can be selected from among the same set of values as the first value, or can be selected from a different set of values.

The second gesture can be identified as having the same types of features as the first gesture. The second gesture can be identified as beginning at a time or location of the end of the first gesture.

In some implementations, the second gesture can occur and be identified, and the second value can be selected before the first value. In some implementations the first gesture and the second gesture can include distinguishing features, for example, the first gesture can be identified by contact detected on one portion of a touch-sensitive surface and the second gesture can be identified by contact detected on a different portion of a touch sensitive surface.

A second value is selected based on the second gesture (210). The second value can be a second search criterion that is used to search for data items in a collection of data items.

The display of the control on the user interface can be updated during the second gesture to indicate the value selected by the control at a given point in time. The user interface can be updated during the second gesture to display different subsets of data items that match the value indicated by the control at a particular point in time. The second value can be selected as the value indicated by the control when the second gesture ends.

A different subset of the data items to display is selected, based on the first value and the second value (212). The different subset of data items can include data items that match both the first value and the second value. The second value and the first value can be included in a query, and data items can be selected based on the query.

The first value can be a character and the second value can be a character. As another example, the first value can be a unit of time (e.g., year) and the second value can be a different unit of time (e.g., month or day).

Information referencing the different subset of data items is displayed (214), thereby ending the process 200 (215). For example, the information can include identifying information for data items that match both the first value and the second value. Information about data items that do not match both the first value and the second value can be excluded from the user interface or can be indicated to not match the first and second value.

The process 200 can also include identifying a first confirmatory gesture input by the user using the control after selecting the first value. The second gesture can be identified after identifying the first confirmatory gesture input by the user.

A gesture can be identified (e.g., identified as a selection gesture or confirmatory gesture, or distinguished from extraneous contacts and movements) based on the similarity between detected movements and contacts and a predetermined set of characteristics and features (e.g., speed, location, sequence, direction, and timing). For example, the selection gesture can be predetermined to include a generally linear series of contacts with a touch-sensitive surface. A detected series of contacts that is determined to include a generally linear component (for example, is determined to be within a threshold level of linearity) can be identified as a selection gesture. The end of a gesture can be determined when, for example, the movement or contact exceeds a defined area, after no movement greater than threshold level is detected for predetermined period of time, or when contact with a touch sensitive surface ends.

Additionally, or alternatively, the process 200 can be carried out using multiple controls. For example, at least one control is displayed, which can include displaying a first control. The first gesture, which can be input by a user using the first control, can be identified. After selecting the first value, a second control that references multiple values can be displayed. A second gesture, input by the user using the second control, can be identified. The first value can be selected before the second value is selected. The values referenced by the second control can be the same or different from the values referenced by the first control.

As another example, a first control referencing multiple values and a second control referencing multiple values can be displayed. A first gesture can be identified, where the first gesture is input by a user using the first control. A second gesture can be identified, where the second gesture is input by a user using the first control. The first control and the second control can be displayed simultaneously, and the first control and the second control can receive gestures simultaneously. The first control can be located on one side of a user interface and the second side can be located an opposite side of the user interface. For example, the first control can be located on the left side and the second control can be located on the right side.

In some implementations, the second value can be selected using the second control before the first value is selected using the first control. For example, the second control can be used to select the second letter of a search term before the first control is used to select the first letter of a search term. A subset of data items can be selected that matches the second value (e.g., second letter of a word), and information referencing the subset can be displayed on the user interface.

Figure 3:
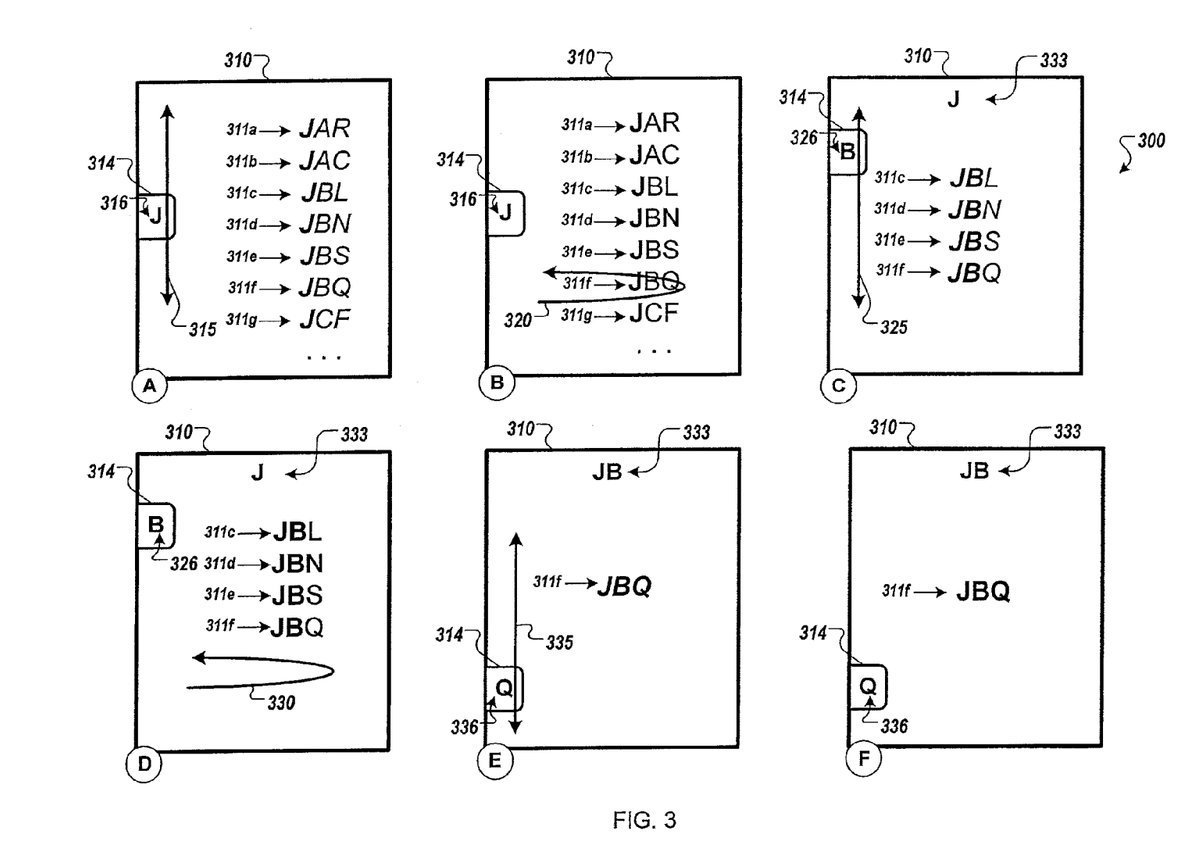
FIGS. 3-5 are diagrams illustrating user interfaces of example systems for selection with gestures.

FIG. 3 is a diagram illustrating a user interface of an example system 300 for selection with gestures. The diagram shows states (A) to (F) illustrating a user interface 310 of a computing device and input from a user.

During state (A), the user performs a first selection gesture 315 using a control 314 displayed on the user interface 310. In response to the first selection gesture 315, a first value 316, "J", is selected from among multiple values referenced by the control 314. In the example shown, the control 314 references a set of characters, such as letters of the alphabet, permitting the user to select a character as a first value 316. The same set of characters is referenced by the control 314 to select a second value 326, a third value 336, and so on. In some implementations, the control 314 can reference a first set of values when selecting a first value 316, and a second different set of values when selecting a second value 326, and so on.

In some implementations, the user interface 310 can be immediately updated to display information referencing a subset of data items 311a-311g that match the first value 316 as soon as the first value 316 changes. For example, the subset of data items 311a-311g can be changed during the first selection gesture 315 to match the first value 316 selected by the control 314 at a particular point in time. As the user uses the control 314 to the selection of the first value 316 from "C" to "D" to "E" the user interface 310 can be updated to display data items matching "C", then data items matching "D", and then data items matching "E".

The first selection gesture 315 can be generally linear, and can include movement in two directions (e.g., up and down) while contact is maintained with a touch-sensitive surface. The computing device can detect the contact with the touch-sensitive surface that occurs during the first selection gesture 315, and can identify the first selection gesture 315 based on, for example, the generally linear movement and contact with a particular portion of the touch-sensitive surface (for example, contact at or near the control 314).

In some implementations, contact with a touch-sensitive surface can be maintained between the first selection gesture 315 and subsequent gestures. In some implementations, a release of contact with a touch sensitive surface after the first selection gesture 315 provides access to information referencing a subset of data items that matches the first value 316 which was selected at the time that contact was released.

During state (B), the user enters a first confirmatory gesture 320 to confirm the selection of the first value 316. The first confirmatory gesture 320 is detected and identified. In response to identifying the first confirmatory gesture 320, the first value 316 can be set or "locked" so that further selection gestures do not change the first value 316. The first confirmatory gesture 320 can also indicate, for example, that a second value should be selected using the control 314. In some implementations, absent the detection of a confirmatory gesture, further selection gestures would change the selection of the first value 316 instead of selecting a second value.

The first confirmatory gesture can include a side-to-side movement, for example, a movement from left to right while in contact with a touch-sensitive surface. The first confirmatory gesture 320 can begin at the time the first selection gesture 315 ends and at the same location on a touch-sensitive surface that the first selection gesture 315 ends. In some implementations, the first confirmatory gesture 320 can also occur a period of time after the first selection gesture 315 ends, and after contact with a touch-sensitive surface has been terminated.

During state (C), the user inputs a second selection gesture 325 using the control 314 to select a second value 326, "B". The user interface 310 can be updated during the second selection gesture 325 to display data items 311c-311f that match both the first value 316 and the currently selected second value 326 that is referenced by the control 314. An indication 333 of values that have been confirmed can be displayed on the user interface 310.

During state (D), the user performs a second confirmatory gesture 335 using the control 314, which confirms the selection of the second value 326. After detection of and identification of the second confirmatory gesture 330, the configuration of the control 314 is adjusted so that a third value is selected when a subsequent selection gesture is input by a user. The second confirmatory gesture 330 can have features similar to the first confirmatory gesture 320.

During state (E), the user uses the control 314 to enter a third selection gesture 335 to select a third value 336, "Q". The user interface 310 can be updated during the third selection gesture 335 to display data item 311f, which matches the first value 316, the second value 326, and the current selection for the third value 336 that is referenced by the control 314. The indication 333 of confirmed values can be updated to display, a combination of the first value 316 and the second value 326, for example, "JB".

During state (F), the user interface 310 displays the data items (in this example, data item 311f) that match the first value 316, the second value 326, and the third value 336. If desired, the user can subsequently enter a third confirmatory gesture (not shown) to confirm the selection of the third value 336. This would cause the control 314 to be changed so that further selection gestures select a fourth value.

During the various gestures input using the control 314, the control can move in response to the gestures and provide an indication of the values or gestures being received. The control 314 can also respond to the speed and location of the gestures.

The selection gestures and 315, 325, 335 and confirmatory gestures 320, 330 can occur without intervening breaks in contact with a touch-sensitive screen. In some implementations, the selection gestures and 315, 325, 335 and confirmatory gestures 320, 330 can also occur with breaks in contact with a touch-sensitive surface between gestures and with significant delays between gestures. For example, in between each of the states (A) through (F), the user can release contact with a touch-sensitive surface. The user can access information about the data items for a time and, for example, scroll through the information displayed using a control other than the control 314. The user can subsequently use the control 314 to perform another of the gestures illustrated and resume selecting and confirming values using the control 314.

The selection gestures 315, 325, 335 and confirmatory gestures 320, 330 can include other features and characteristic than the ones illustrated. The control 314, or another control, can be used to enter a gesture that unselects a value, or cancels the confirmation of a value. For example, a gesture in a particular portion of a touch-sensitive surface can transition backward through states (A) to (F), such as from state (F) to state (E), from state (E) to state (D), and so on.

Figure 4:
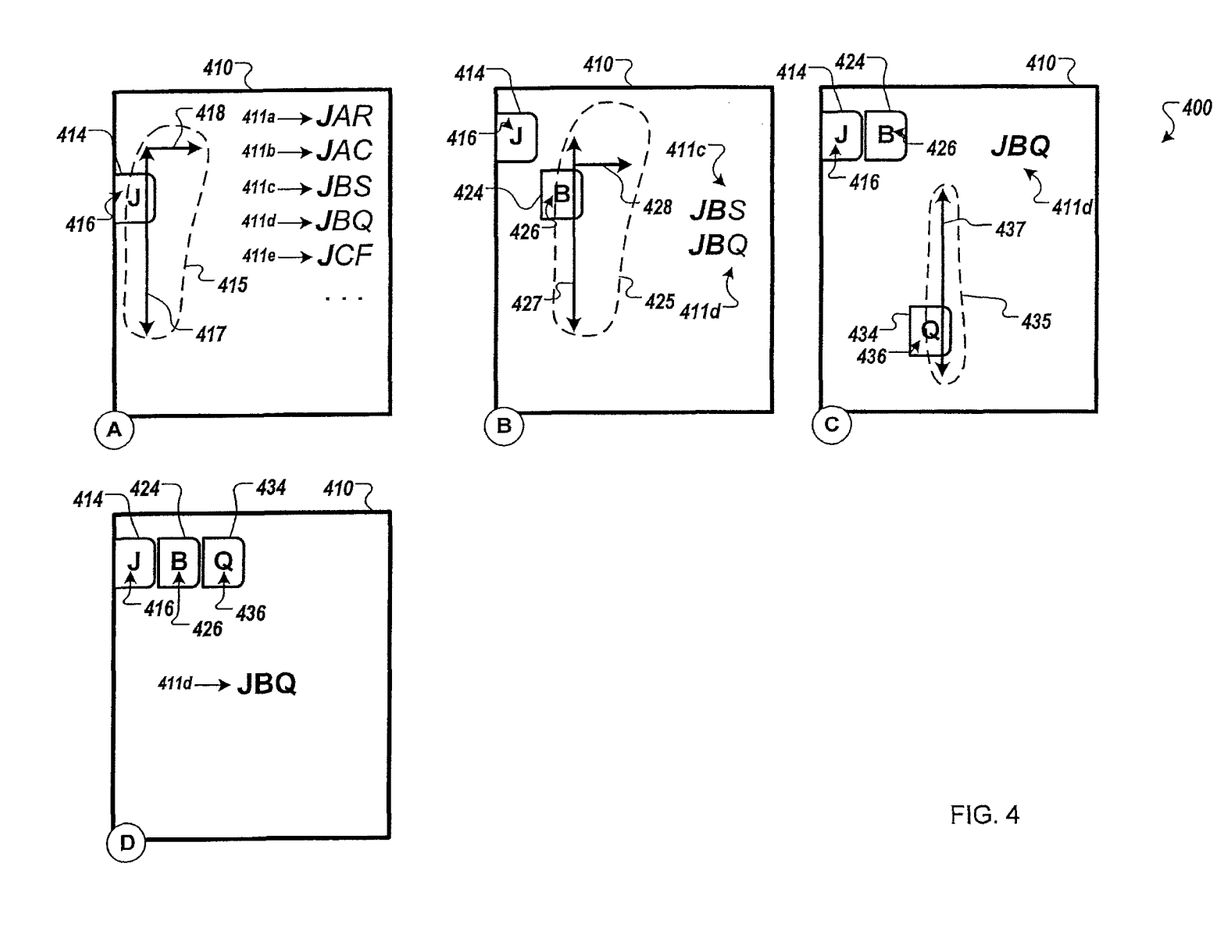

FIG. 4 is a diagram illustrating a user interface of an example system 400 for selection with gestures. The diagram shows states (A) to (D) illustrating a user interface 410 of a computing device and input from a user.

During state (A), the user performs a first gesture 415 using a first control 414 that is displayed on a user interface 410. The first gesture 415 is detected and identified as valid input for the first control 414. In response to the first gesture 415, a first value 416 is selected from among a set of values referenced by the first control 414. In this example, the first value 416 is selected to be "J". The selection of the first value 416 causes information displayed on the user interface 410 to be changed, for example, to display information referencing data items 411*a*-411*e* that match the first value 416.

The first gesture 415 includes a generally vertical movement 417 and a generally horizontal movement 418. The vertical movement 417 can include movement in two directions (for example, both up and down) to select the first value 416. The horizontal movement 418 can be performed after the vertical movement. Contact can be maintained with a touch-sensitive surface during the vertical movement 417 and the horizontal movement 418 so that the first gesture 415 defines a continuous path. Valid gestures for the first control 414 (and other controls) can be defined to include both a particular combination of features, such as a vertical movement followed by a horizontal movement without a break in contact with a touch-sensitive surface.

During state (B), a second control 424 is displayed on the user interface 410 in response to the first gesture 415. The user performs a second gesture 425 using the second control 424 to select a second value 426. The second gesture 425 can include a generally vertical movement 427 and a generally horizontal movement 428 similar to the movements 417, 418 of the first gesture 415.

In response to the second gesture 425, a second value 426 is selected from among a set of values referenced by the second control 424. In this example, the second value 426 is selected to be "B". The selection of the second value 426 causes information displayed on the user interface 410 to be changed, for example, to display information referencing data items 411*c*-411*d* that match both the first value 416 and the second value 426.

During state (C), a third control 434 is displayed on the user interface 410 in response to the second gesture 425. The user performs a third gesture 435 using the third control 434 to select a third value 436. In response to the third gesture 435, a third value 436 is selected from among a set of values referenced by the third control 434. In this example, the third value 436 is selected to be "Q". The selection of the third value 436 causes information displayed on the user interface 410 to be changed, for example, to display information referencing data items (such as data item 411*d*) that match the first value 416, the second value 426, and the third value 436. For example, the data items can be those that match a search query term "JBQ".

Unlike the first gesture 415 and the second gesture 425, the third gesture includes vertical movement 437 but does not include a generally horizontal movement. This can indicate that the third value 436 should be selected, but that no additional controls should be displayed to select additional values.

During state (D), information referencing data items (such as data item 411*d*) that match the first value 416, the second value 426, and the third value 436 are displayed on the user interface 410. The first control 414, the second control 424, and the third control 434 can be displayed on the user interface 410. In some implementations, the controls 414, 424, 434 can be used to enter additional gestures to alter the selection of the respective values 416, 426, 436. Additional gestures can also be performed to add additional controls to select additional values.

The first control 414, the second control 424, and the third control 434 can be implemented as separate controls or as components of a single control. In addition, additional gestures other than those shown can be performed, detected, and identified, including intervening gestures between the various states (A) to (D).

Figure 5:
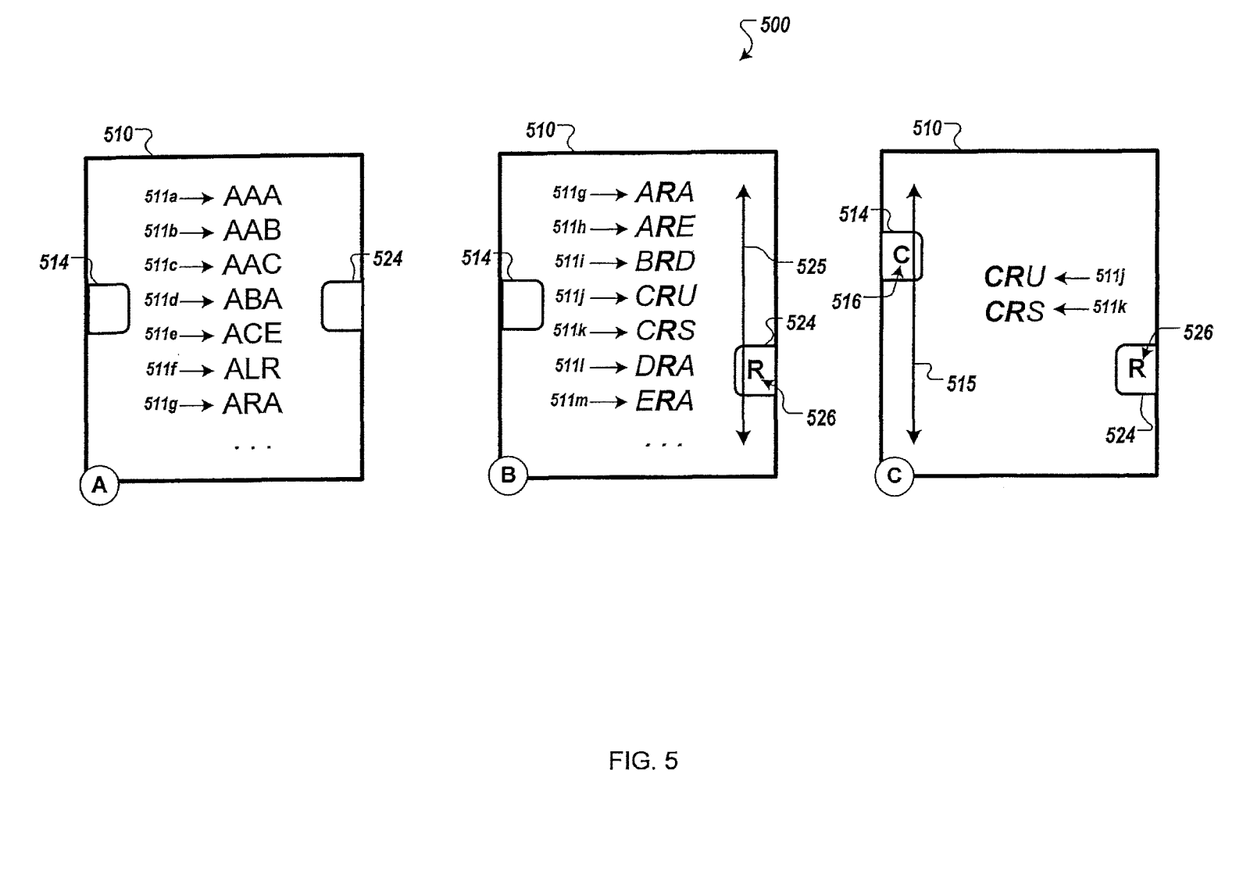

FIG. 5 is a diagram illustrating a user interface of an example system 500 for selection with gestures. The diagram shows states (A) to (C) illustrating a user interface 510 of a computing device and input from a user.

During state (A), information referencing data items 511*a*-511*g* is displayed on a user interface with two controls 514, 524. The data items 511*a*-511*g* for which information is displayed can be part of a larger list of data items 511*a*-511*m*.

Each control 514, 524 can select among a set of values referenced by the respective controls 514, 516. The first control 514 references a first set of values, and the second control 524 references a second set of values. The first and second sets may or may not include the same values. The first control 514 can be used to select a first value 516, such as the first letter of a search query term. The second control 524 can select a second value 526, such as the second letter of a search query term. The controls 514, 524 are shown in an uninitialized state in which no values are currently selected. In some implementations, a non-selection or acceptance of all values can be a selectable option for a control 514, 524. As a result, the user interface 510 displays information referencing the data items 511*a*-511*g* in a list without filtering the list or selecting particular data items. In some instances, the subset of data items 511*a*-511*g* for which information is displayed may be limited simply by the available screen area.

The controls 514, 524 can be implemented as separate controls or as components of a single control. In some implementations, the controls 514, 524 can be displayed on opposite sides of a user interface 510. This can permit the user to enter a gesture with one thumb while also entering a gesture using the other thumb while holding the computing device with both hands. In some implementations, the controls 514, 524 can receive gestures simultaneously. The controls 514, 524 can also receive gestures one after another, in any sequence.

In some implementations, the value selected by each control 514, 524 is assigned a particular interpretation. For example, in some implementations, the first value 516 corresponds to the first letter of an identifier and the second value 526 corresponds to the second letter of an identifier, independent of the sequence in which the first value 516 and the second value 526 are selected.

During state (B), the user inputs a gesture 525 using the second control 516 to select a second value 526. In the example, the second value 526 is selected to be "R". As shown, the second value 526 can be selected using the second control 516 before the first value 516 is selected using the first control 516. This permits the user to search by selecting, for example, the second letter of a search term before the first letter is selected. The user interface 510 is updated to display data items 511*g*-511*m* that match the second value 526. For example, data items 511*g*-511*m* having an identifier for which the second letter is "R" are displayed, such as "ara", "are", and "brd".

During state (C), the user inputs a gesture 515 using the first control 514 to select a first value 516. In the example, the first value 516 is selected to be "C". The selection of the first value 516 does not change or unselect the second value 516, even though the first value 516 is selected after the second value 526, and even though the first value 516 occurs before the second value 526 in the sequence that makes up a query term.

Information referencing data items 511*j*-511*k* that match both the first value 516 and the second value 516 in the appropriate sequence (e.g., data items that match a search query term "CR") are displayed on the user interface 510. The user can subsequently access the information displayed on the user interface 510. The user can also subsequently use the controls 514, 524 to modify the selections of the first value 516 and the second value 526. In response, the subset of data items 511*a*-511*m* for which information is displayed can be modified in response.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the technology and all of the functional operations described in this specification can be implemented in digital electronic circuitry, or in computer software, firmware, or hardware, including the structures disclosed in this specification and their structural equivalents, or in combinations of one or more of them. Embodiments of the technology can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the technology described or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments have been described. Other embodiments are within the scope of the following claims. For example, the steps recited in the claims can be performed in a different order and still achieve desirable results.

What is claimed is:

1. A computer-implemented method comprising:
   receiving, by a computing device, data that represents a first set of data items;
   receiving, by the computing device, an indication of a first user input gesture performed on a touch-sensitive display of the computing device;
   selecting a first alphanumeric character based on the first user input gesture;
   receiving, by the computing device, an indication of a second user input gesture performed on the touch-sensitive display of the computing device, the second user input gesture performed without a release from the touch-sensitive display between the first user input gesture and the second user input gesture;
   determining that the second user input gesture corresponds to a pre-defined confirmation gesture;
   in response to determining that the second user input gesture corresponds to a pre-defined confirmation gesture, designating the first alphanumeric character as a first confirmed value;
   receiving, by the computing device, an indication of a third user input gesture performed on the touch-sensitive display of the computing device, the third user input gesture performed without a release from the touch-sensitive display between the second user input gesture and the third user input gesture;
   selecting a second alphanumeric character based on the third user input gesture;
   designating the second alphanumeric character as a second confirmed value;
   identifying, by the computing device, a subset of data items from the first set of data items based on the first confirmed value and the second confirmed value; and
   displaying, at the touch-sensitive display and in response to receiving the indication of the third user input gesture, a representation of at least a portion of the subset of the data items.

2. The computer-implemented method of claim 1, wherein the indication of the first user input gesture is received as having been performed over a displayed list of at least a portion of the first set of data items.

3. The computer-implemented method of claim 1, further comprising displaying a graphical element that scrolls through alphanumeric characters in conjunction with performance of the first user input gesture, wherein:
   selecting the first alphanumeric character comprises selecting a particular character that is displayed on the graphical element when the first user input gesture ends, and
   selecting the second alphanumeric character comprises selecting another particular character that is displayed on the graphical element when the third user input gesture ends.

4. A system comprising:
   one or more processors; and
   a computer-readable medium coupled to the one or more processors having instructions stored thereon which, when executed by the one or more processors, cause the system to perform operations comprising:
   receiving data that represents a first set of data items;
   receiving an indication of a first user input gesture performed on a touch-sensitive display;
   selecting a first alphanumeric character based on the first user input gesture;
   receiving an indication of a second user input gesture performed on the touch-sensitive display, the second user input gesture performed without a release from the touch-sensitive display between the first user input gesture and the second user input gesture;
   determining that the second user input gesture corresponds to a pre-defined confirmation gesture;
   in response to determining that the second user input gesture corresponds to a pre-defined confirmation gesture, designating the first alphanumeric character as a first confirmed value;
   receiving an indication of a third user input gesture performed on the touch-sensitive display, the third user input gesture performed without a release from the touch-sensitive display between the second user input gesture and the third user input gesture;
   selecting a second alphanumeric character based on the third user input gesture;
   designating the second alphanumeric character as a second confirmed value;
   identifying a subset of data items from the first set of data items based on the first confirmed value and the second confirmed value; and
   displaying, at the touch-sensitive display and in response to receiving the indication of the third user input gesture, a representation of at least a portion of the subset of the data items.

5. A non-transitory computer storage medium encoded with a computer program, the program comprising instructions that when executed by one or more computers cause the one or more computers to perform operations comprising:
   receiving data that represents a first set of data items;
   receiving an indication of a first user input gesture performed on a touch-sensitive display;
   selecting a first alphanumeric character based on the first user input gesture;

receiving an indication of a second user input gesture performed on the touch-sensitive display, the second user input gesture performed without a release from the touch-sensitive display between the first user input gesture and the second user input gesture;

determining that the second user input gesture corresponds to a pre-defined confirmation gesture;

in response to determining that the second user input gesture corresponds to a pre-defined confirmation gesture, designating the first alphanumeric character as a first confirmed value;

receiving an indication of a third user input gesture performed on the touch-sensitive display, the third user input gesture performed without a release from the touch-sensitive display between the second user input gesture and the third user input gesture;

selecting a second alphanumeric character based on the third user input gesture;

designating the second alphanumeric character as a second confirmed value;

identifying a subset of data items from the first set of data items based on the first confirmed value and the second confirmed value; and displaying, at the touch-sensitive display and in response to receiving the indication of the third user input gesture, a representation of at least a portion of the subset of the data items.

6. The computer-implemented method of claim 1, wherein the second user input gesture comprises a pause in user input movement on the touch-sensitive display while contact with the touch-sensitive display is maintained between the first user input gesture and the third user input gesture.

7. The computer-implemented method of claim 6, wherein determining that the second user input gesture corresponds to a pre-defined confirmation gesture comprises determining that a duration of the pause in the second user input gesture satisfies a predetermined minimum duration.

8. The computer-implemented method of claim 1, wherein the first user input gesture and the second user input gesture each comprise movement on the touch-sensitive display in a direction that is within a predetermined linearity threshold.

9. The computer-implemented method of claim 1, wherein the first user input gesture, the second user input gesture, and the third user input gesture are performed in sequence to trace a continuous path on the touch-sensitive display.

10. The computer-implemented method of claim 3, wherein the graphical element is configured to scroll through all of the letters in the alphabet.

11. The computer-implemented method of claim 1, further comprising scrolling through the alphanumeric characters in the display of the graphical element in response to detecting motion along a linear component of the first user input gesture.

12. The computer-implemented method of claim 1, wherein:
- identifying the subset of data items from the first set of data items based on the first confirmed value and the second confirmed value comprises selecting particular data items from the first set of data items that have an identifier that includes a sequence of alphanumeric characters that match the first alphanumeric character and the second alphanumeric character; and
- displaying the representation of at least the portion of the subset of the data items comprises displaying the identifiers of particular ones of the particular data items.

13. The computer-implemented method of claim 1, wherein each of the data items in the subset of data items has a corresponding identifier, each identifier having (i) an initial character that matches the first alphanumeric character and (ii) a character immediately after the initial character that matches the second alphanumeric character.

14. The computer-implemented method of claim 1, wherein the second user input gesture comprises a lateral motion, across the touch-sensitive display, that is perpendicular to the first user input gesture within a defined tolerance.

15. The computer-implemented method of claim 1, further comprising:
- identifying, in response to designating the first alphanumeric character as the first confirmed value, an initial subset of data items from the first set of data items based on the first confirmed value; and
- displaying, at the touch-sensitive display and in response to determining that the second user input gesture corresponds to the pre-defined confirmation gesture, a representation of the initial subset of data items.

* * * * *